(12) United States Patent
Minton

(10) Patent No.: US 9,568,039 B2
(45) Date of Patent: Feb. 14, 2017

(54) CRANKSHAFT ASSEMBLY WITH POLYGON CRANK PIN

(71) Applicant: STOFFEL POLYGON SYSTEMS, INC., Tuckahoe, NY (US)

(72) Inventor: David Michael Minton, Auburndale, NY (US)

(73) Assignee: STOFFEL POLYGON SYSTEMS, INC., Tuckahoe, NY (US)

( * ) Notice: Subject to any disclaimer, the term of this patent is extended or adjusted under 35 U.S.C. 154(b) by 0 days.

(21) Appl. No.: 14/643,740

(22) Filed: Mar. 10, 2015

(65) Prior Publication Data

US 2016/0265579 A1 Sep. 15, 2016

(51) Int. Cl.
| | |
|---|---|
| *F16C 3/04* | (2006.01) |
| *F16C 11/02* | (2006.01) |
| *F16C 3/20* | (2006.01) |
| *F02B 61/02* | (2006.01) |
| *F16F 15/26* | (2006.01) |
| *F16C 9/04* | (2006.01) |

(52) U.S. Cl.
CPC ............... *F16C 3/20* (2013.01); *F02B 61/02* (2013.01); *F16C 9/04* (2013.01); *F16C 11/02* (2013.01); *F16F 15/26* (2013.01)

(58) Field of Classification Search
CPC ............... F16C 3/20; F16C 3/06; F16C 3/18; F16C 11/02; F16C 9/04; F16F 15/26; F02B 61/02; B62K 11/02; Y10T 74/2173
See application file for complete search history.

(56) References Cited

U.S. PATENT DOCUMENTS

| | | | |
|---|---|---|---|
| 344,930 A | 7/1886 | Woodbury | |
| 530,580 A | 12/1894 | Crawford | |
| 1,024,817 A | 4/1912 | Arnold | |
| 1,283,803 A | 11/1918 | Kirkham | |
| 1,690,296 A | 12/1920 | Hirth | |
| 1,548,148 A * | 8/1925 | Lorenzen | F16C 23/04 384/206 |
| 1,717,572 A | 8/1928 | Martin et al. | |
| 2,151,624 A | 3/1930 | Smith-Clarke | |
| 2,324,373 A | 9/1942 | Dusevoir | |
| 2,340,456 A | 2/1944 | Dinley | |
| 2,364,109 A | 12/1944 | Taylor | |

(Continued)

FOREIGN PATENT DOCUMENTS

DE    2518150 A1 * 11/1976    ............ F01C 21/008

OTHER PUBLICATIONS

Oberg et al, Machinery Handbook, 1988, pp. 2047-2048, Industrial Press Inc., NY, USA.; 23d edition.

*Primary Examiner* — Adam D Rogers
(74) *Attorney, Agent, or Firm* — Roberts Mlotkowski Safran Cole & Calderon P.C.; Jorie L. Stroup

(57) ABSTRACT

A crankshaft assembly for a motorcycle includes a first flywheel half with a polygonal-shaped aperture therein and a second flywheel half with a polygonal-shaped aperture therein. The first and second flywheel halves are interconnected by press-fitting opposing first and second polygonal shaped end portions of a crank pin into respective polygonal-shaped apertures of the first and second flywheel half. A bearing is positioned at least partially on a surface of a cylindrical central portion of the crank pin and a connecting rod has an aperture at least partially receiving the bearing.

12 Claims, 4 Drawing Sheets

(56) References Cited

U.S. PATENT DOCUMENTS

| | | | |
|---|---|---|---|
| 2,380,099 | A | 7/1945 | Dusivoir |
| 2,448,742 | A | 9/1948 | Smith-Clarke |
| 2,747,428 | A | 5/1956 | Peter |
| 4,835,832 | A | 6/1989 | Arnold |
| 5,088,345 | A * | 2/1992 | Kemmler .................. F16C 3/10 29/888.08 |
| 5,207,120 | A | 5/1993 | Arnold |
| 5,894,763 | A | 4/1999 | Peters |
| 6,164,159 | A | 12/2000 | Saker |
| 6,752,120 | B2 * | 6/2004 | Saito .................... F02F 7/0043 123/197.4 |
| 7,140,272 | B2 * | 11/2006 | Suzuki ................... B23P 11/00 29/888.08 |
| 7,418,939 | B2 | 9/2008 | Enright et al. |

* cited by examiner

CRANKSHAFT ASSEMBLY WITH POLYGON CRANK PIN

BACKGROUND OF THE INVENTION

1. Field of the Invention

The present invention pertains to the art of crankshaft assemblies, and more particularly, to a crankshaft assembly for a motor vehicle.

2. Discussion of the Prior Art

Since the invention of the internal combustion engine over 100 years ago, nearly all crankshafts have been one piece, whether cast, forged, or machined from billets, whether for model airplane engines or huge diesels for ship propulsion or power generation. Connecting rods for the crank pins of these crankshafts had to be split or made of two pieces to allow assembly onto the crankshaft. In a minority of engines it was advantageous to utilize one piece connecting rods, thus requiring a multi-piece (assembled) built up crankshaft. The crankpin end of the connecting rod is slid onto the crankpin, and the crankpin then assembled to the flanges of the crankshaft. In smaller engines, perhaps under about 2" stroke, a simple "press fit" assembly method works satisfactorily. On engines with greater strokes, the problem with an assembled (as opposed to a one piece or integral) crankshaft is that the flanges can rotate around the crankpin, thus losing the required perfect alignment of both flanges with each other. Misalignment results in excess vibration and the crankshaft becoming unbalanced, which causes more vibration. When a flange rotates past a certain point on the crankpin, the crankshaft assembly breaks apart catastrophically and the entire engine is destroyed.

There have been numerous attempts to overcome the problem of the flywheels shifting or twisting on the crankpin that connects them. For example, some practitioners in the market today weld the crankpin to the crankshaft flanges to try to prevent rotation of the flange(s) about the crankpin. However, this makes it impossible to disassemble the crankshaft to renew the crankpin bearings.

In an attempt to overcome unsatisfactory mechanical solutions to the problem of flywheel shifting, Harley-Davidson Motor Company developed a specific coating for the ends of the crankpin to increase the friction between the crankpin and the flywheel flange it was pressed into, as set forth in U.S. Pat. No. 7,418,939 issued in 2008. This solution has since been incorporated into production engines, indicating that the earlier attempts to solve the problem of shifting were less than 100% successful. However, this method requires an additional manufacturing step of applying a coating of friction enhancer to a crank pin, adding to the cost and complexity of manufacturing.

Therefore, there is seen to be a need in the art for a new crankshaft assembly that resists undesirable rotation around the crankpin.

SUMMARY OF THE INVENTION

The present invention is directed to an improved crankshaft assembly for a motorcycle having increased strength and resistance to torque. More specifically, the crankshaft assembly of the present invention includes a crank pin having a cylindrical central portion positioned between first and second polygonal-shaped ends. In a preferred embodiment, each end of the crank pin includes three interconnecting side wall portions forming a polygonal shape. The crankshaft assembly further includes a pinion side flywheel half, a sprocket side flywheel half, and respective end portions adapted to be rotatably coupled to a crankcase of an engine. The first and second flywheel halves each include a polygonal-shaped hole for receiving a respective end of the crank pin in an interference fit. Crank pin plugs are sized to fit within a bore of the crank pin at respective opposing ends.

In use, first and second connecting rods are rotatably coupled to the cylindrical central portion of the crank pin via roller element bearings. Next, an end of the first connecting rod is positioned between split portions of the second connecting rod to align the bores in the ends of the first and second connecting rods. With the bores aligned, the roller element bearing is inserted into bores of the first and second connecting rods. The crank pin is then press-fit into the holes of the respective flywheel halves. The improved crankshaft assembly may replace a stock crankshaft within a motorcycle, or may be included as a stock part in the manufacturing of a motorcycle.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
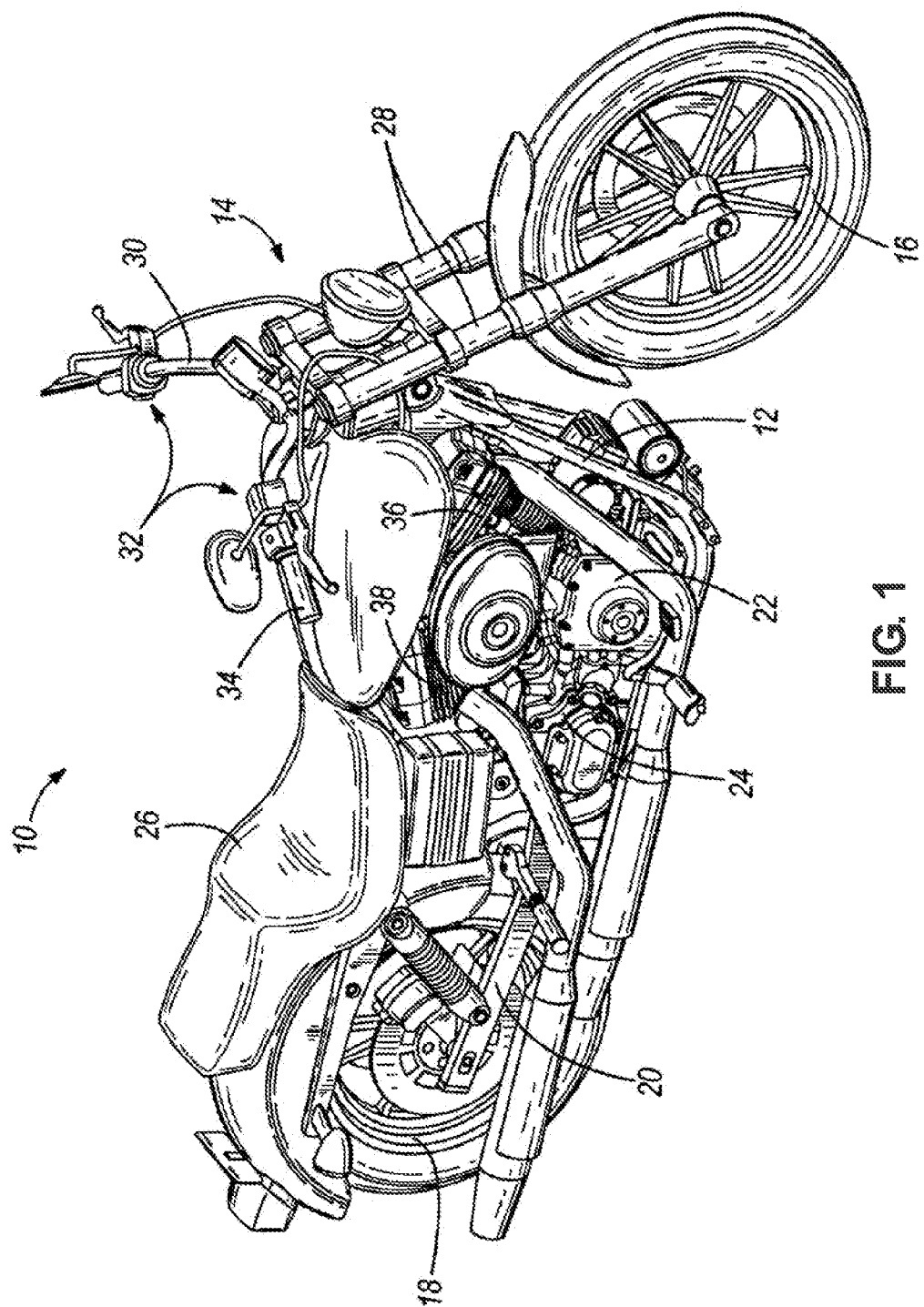
FIG. 1 is a perspective view of a motorcycle for use with the crankshaft of the present invention.

With initial reference to FIG. 1, an existing motorcycle 10 for use with the present invention is depicted. Motorcycle 10 includes a frame 12, a steering assembly 14 pivotably mounted to a forward portion of frame 12, a front wheel 16 rotatably mounted to an end of steering assembly 14, a rear wheel 18 rotatably mounted to a swing arm 20 that is pivotably connected to a rearward portion of frame 12, and an engine 22 and transmission 24 mounted to frame 12 and operably coupled to rear wheel 18. A seat 26 is coupled to frame 12 above rear wheel 18. The steering assembly 14 includes a fork 28, handlebars 30, and controls 32, such as a throttle grip 34, coupled to handlebars 30. As is well understood by one of ordinary skill in the art, an operator manipulates controls 32 to power engine 22 and transmission 24, drive rear wheel 18, and propel motorcycle 10. Handlebars 30 are manipulated to pivot steering assembly 14 and front wheel 16 to steer motorcycle 10. Engine 22 is an internal combustion engine including a first or front cylinder 36 and a second or rear cylinder 38. In other embodiments, engine 22 can include more or less than two cylinders arranged in any suitable fashion such as, for example, a "V" configuration, an opposed configuration, or an inline configuration.

Figure 3:
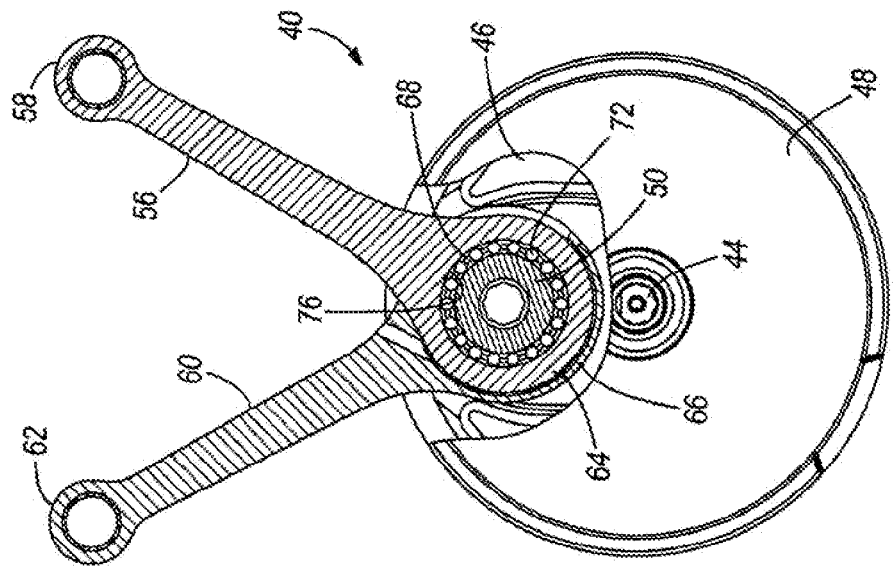
FIG. 3 is a cut-away section view of the prior art crankshaft assembly of FIG. 2.
Figure 2:
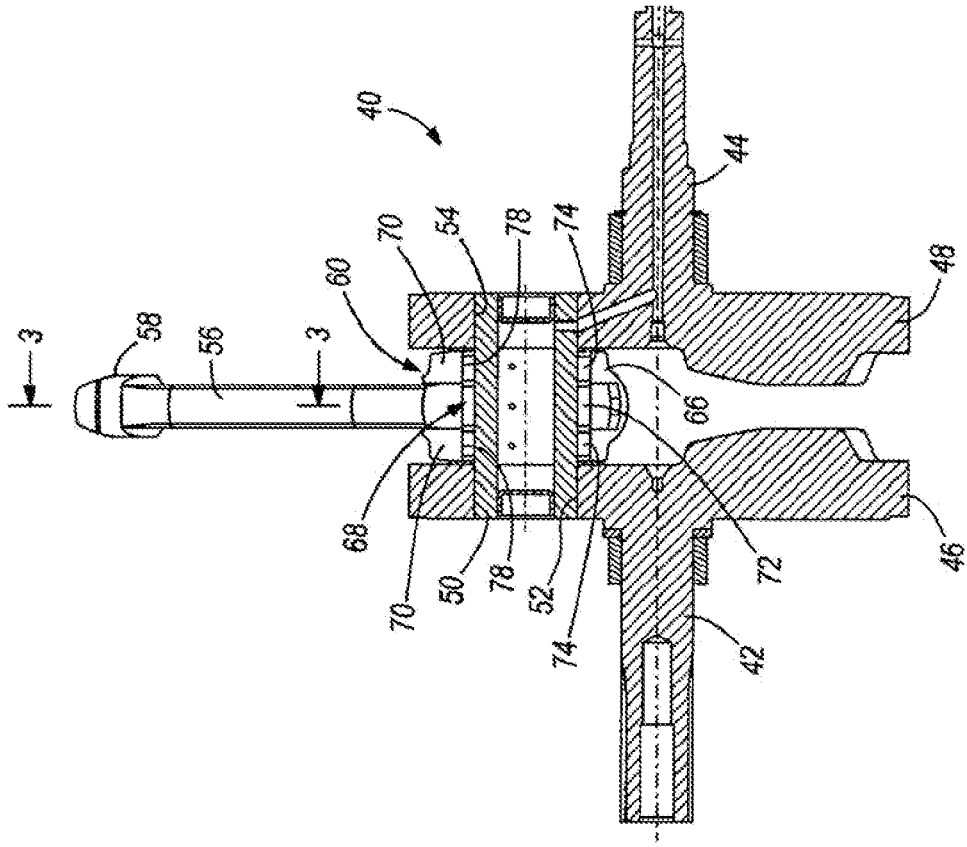
FIG. 2 is a cross-section view of a prior art crankshaft assembly.

Reference will now be made to FIGS. 2 and 3 in describing a prior art crankshaft set forth in U.S. Pat. No. 7,418,939.

A known crankshaft assembly 40 is shown having first and second crankshaft ends 42, 44 rotatably coupled to a crankcase (not shown) of an engine (not shown). The assembly 40 includes first and second flywheel halves 46, 48 coupled together with a single cylindrical crank pin 50. Crank pin 50 is connected to each of flywheel halves 46, 48 by press-fitting crank pin 50 into corresponding holes 52, 54 of flywheel halves 46, 48.

Crankshaft assembly 40 also includes a first connecting rod 56 rotatably coupled at one end 58 to a piston (not shown) reciprocally disposed within a first motorcycle cylinder and a second connecting rod 60 rotatably coupled at one end 62 to another piston (not shown) reciprocally disposed within a second motorcycle cylinder. Opposite ends 64, 66 of first and second connecting rods 56, 60 are rotatably connected to crank pin 50 with a roller element bearing 68. End 66 of second connecting rod 60 is split such that end 64 of first connecting rod 56 can be received between split portions 70 of second connecting rod 60. Roller element bearing 68 is a needle bearing having center needle rollers 72 and end needle rollers 74 on opposite sides of the center needle rollers 72. A bore 76 in end 64 of first connecting rod 56 defines the outer race of center needle rollers 72, and bores 78 in split portions 70 of second connecting rod 60 define the outer races of end needle rollers 74.

Figure 4:
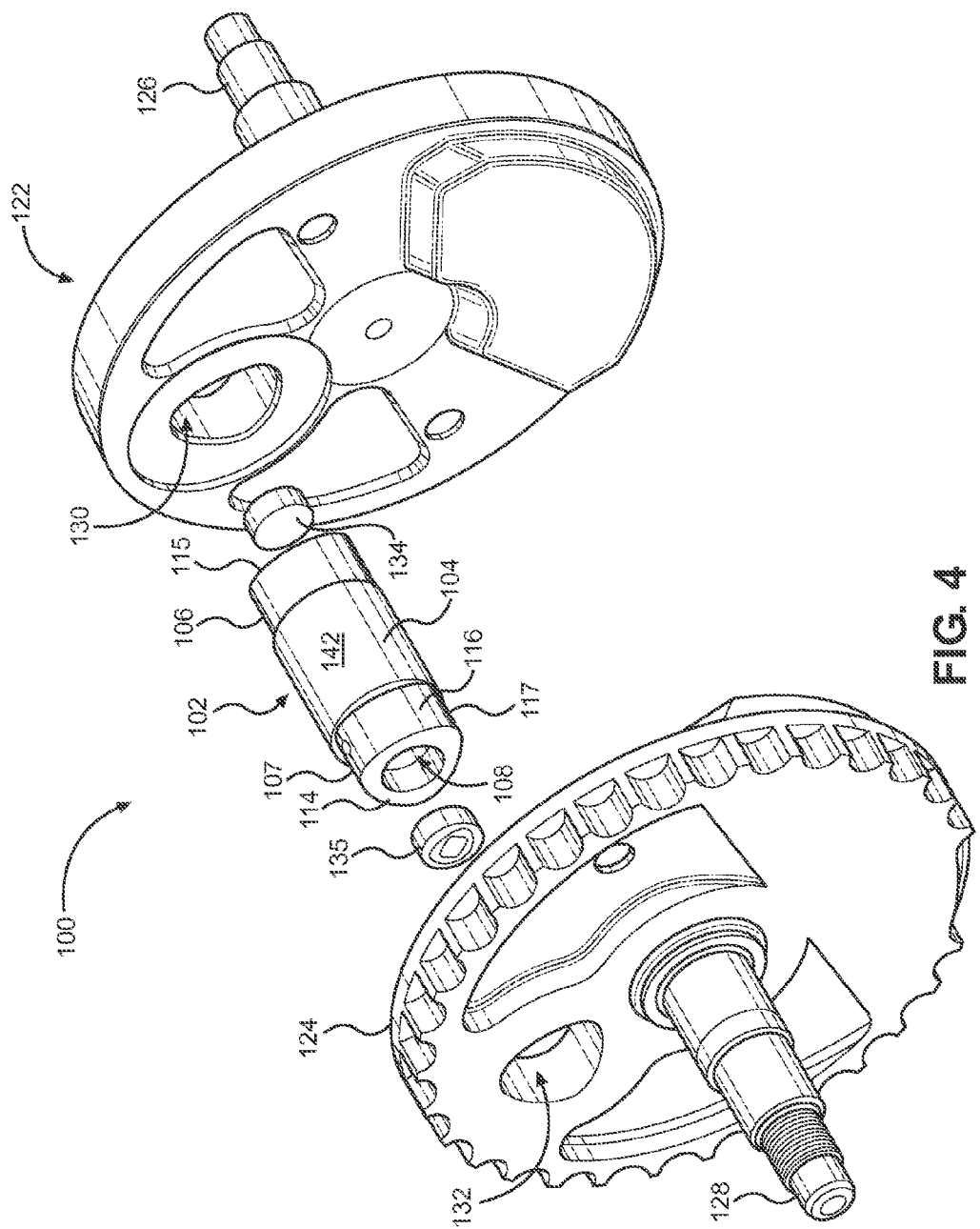
FIG. 4 is an exploded view of a crankshaft assembly of the present invention.
Figure 5:
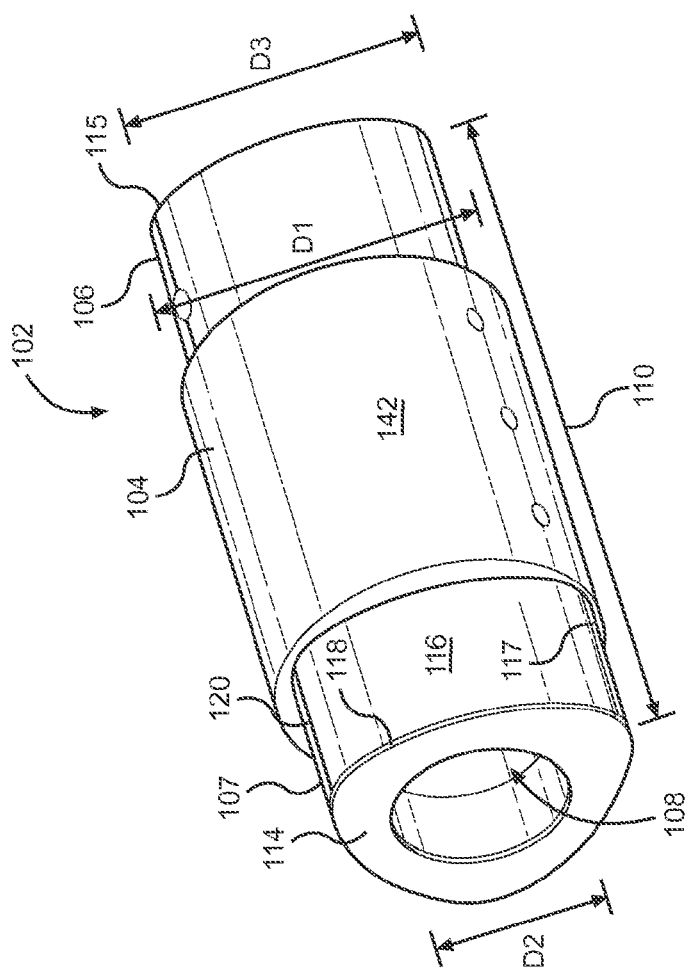
FIG. 5 is a perspective view of a crankpin of the present invention.

The present invention provides an improvement over the prior art crankshaft of FIGS. 2 and 3. More specifically, as depicted in FIGS. 4 and 5, an improve crankshaft assembly 100 includes a crank pin 102, including a cylindrical central portion 104 positioned between first and second polygonal-shaped ends 106 and 107, the central portion 104 having a diameter D1. Improved crankshaft assembly 100 may replace a stock crankshaft within a motorcycle, or may be included as a stock part in the manufacturing of a motorcycle. As best illustrated in FIG. 5, a bore 108 extends through a length 110 of pin 102, and includes an inside diameter D2. Ends 106 and 107 each include a maximum outer diameter D3, respective end faces 114 and 115, and respective interconnecting side wall portions 116. Outer diameter D1 of central portion 104 is greater than outer diameter D3 of ends 106 and 107.

In the embodiment shown, each end 106 and 107 of pin 102 includes three side wall portions 116 interconnecting at corners 117 and forming a polygonal shape. The term polygonal is intended to refer to a polygon-type shape resembling a regular polygon but with curved sides. See, for example, German DIN Standards 32711 and 32712 for three and four sided polygon connections. The outer peripheral portions 118 of the end faces 114 and 115 of pin 102 are chamfered. The chamfer on the outside perimeter is blended into the finished sidewall portions 116 such that no ridges or discontinuities are visible. Likewise, side wall portions 116 interconnect by chamfered portions 120 at corners 117.

With reference to FIG. 4, it can be seen that crankshaft assembly 100 further includes a pinion side flywheel half 122, a sprocket side flywheel half 124, and respective end portions 126 and 128 adapted to be rotatably coupled to a crankcase of an engine (not shown). Flywheel half 122 includes a polygonal-shaped hole 130 for receiving first end 106 of pin 102 in an interference fit. Similarly, flywheel have 124 includes a polygonal-shaped hole 132 for receiving second end 107 of pin 102 in an interference fit. Crank pin plugs 134 and 135 are sized to fit within bore 108 at respective opposing ends 106 and 107. During assembly, first end 106 of pin 102 is press-fit into hole 130 of flywheel half 122, and second end 107 is press-fit into hole 132 of flywheel half 124. The outer cylindrical surface 142 of central portion 104 provides a bearing surface for engaging a bearing.

Figure 6:
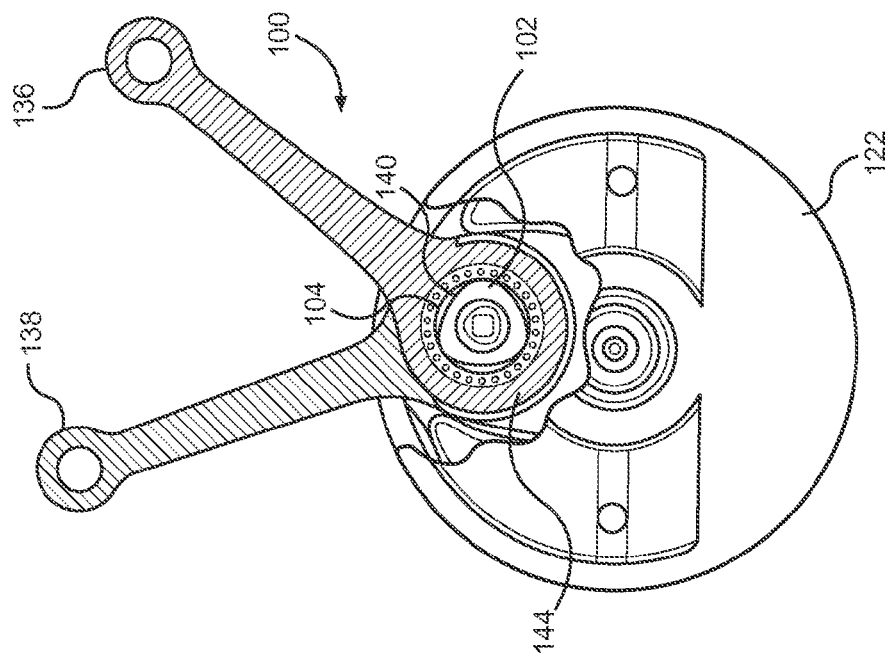
FIG. 6 is a cut-away view of an assembled crankshaft assembly of the present invention.

As depicted in FIG. 6, first and second connecting rods 136 and 138 are then be rotatably coupled to cylindrical central portion 104 of pin 102 via roller element bearings 140. To assemble crankshaft assembly 100, a cylindrical blank with a bore 108 there through is machined, heat treated, and then the polygonal-shaped ends 106 and 107 are machined out of the cylindrical blank. Next, an end 144 of first connecting rod 136 is positioned between split portions (not shown) of second connecting rod 138 to align the bores (not shown) in the ends of the first and second connecting rods 136 and 138. Then, with the bores aligned, the roller element bearing 140 is inserted into bores of the first and second connecting rods. The crank pin 102 is then press-fit into the holes 130, 132 of the respective flywheel halves 122, 124. In other embodiments, the crank pin 102 can be press-fit into a single polygon flywheel half prior to assembling the connecting rods and roller element bearing to the crank pin 102.

Surprisingly, the unique shape of crank pin 102, and the polygonal shape of holes 130 and 132, provide an extreme improvement in strength of the overall crankshaft assembly when compared to prior art crankshaft assemblies. More specifically, the following crankshaft assemblies were compared in a strength test: (1) a Harley-Davidson® brand stock assembly, (2) A Harley-Davidson® brand stock assembly with the crank pin welded to respective flywheel halves, and (3) an S&S® brand crankshaft assembly. In order to compare the strength of three known crankshaft assemblies to the crankshaft assembly 100 of the present invention, the following experimental protocol was followed. For each test, the pinion side flywheel half of the crankshaft was securely fixed to a holding fixture so that the pinion side flywheel half was rendered immobile during the test. A first end of a twenty foot (20') pipe was connected to the sprocket side flywheel half of the assembly, and a second end of the pipe was connected to a torque wrench. Holding the torque wrench, an operator applied a downward force to the wrench and attached pipe until the sprocket side flywheel half of the assembly shifted with respect to the pinion side flywheel half, or the torque wrench reached its maximum reading capacity of 600 ft-lb. The torque reading was then multiplied by 8.324 to convert the torque for the twenty foot lever arm (i.e. pipe). The converted torque results of the test are presented in the table below.

TABLE 1

Flywheel Torque Test Results

| Flywheel Design | Converted Torque Before Flywheel Shift (ft-lb) |
| --- | --- |
| Harley-Davidson ® Stock Assembly | 2337 |
| Modified Harley-Davidson ® Stock Assembly | 2355 |
| S&S ® Assembly | 2838 |
| Improved Polygon Assembly | 5008+ |

After applying 600 ft-lb of torque to the improved polygon assembly 100 of the present invention, the flywheels 122, 124 did not shift with respect to one another. As can be seen by the results, the improved polygon assembly 100 of the present invention showed a vast improvement in strength over the prior art assemblies tested.

Although described with reference to a preferred embodiment of the invention, it should be readily understood that various changes and/or modifications can be made to the invention without departing from the spirit thereof. The invention is capable of other embodiments and of being practiced or of being carried out in various ways. In general, the invention is only intended to be limited by the scope of the following claims.

I claim:

1. A polygon crankshaft assembly comprising:
   a first polygon flywheel half with a polygonal-shape aperture therein; and
   a crank pin including a polygonal-shaped first end portion machined from heat-treated metal, a polygonal-shaped second end portion machined from the heat-treated metal opposite the polygonal-shaped first end portion, and a cylindrical central portion between the first and second polygonal-shaped end portions, the polygonal-shaped first end portion adapted to be press-fit into the polygonal-shaped aperture of the first flywheel half.

2. The polygon crankshaft assembly of claim 1, further comprising:
   a bearing adapted to be positioned at least partially on a surface of the cylindrical central portion.

3. The polygon crankshaft assembly of claim 1, further comprising:
   a second polygon flywheel half with a polygonal shaped aperture therein, wherein the polygonal-shaped second end portion of the crank pin is adapted to be press-fit into the polygonal-shaped aperture of the second flywheel half;
   wherein the polygon crankshaft is a three-piece crankshaft assembly.

4. The polygon crankshaft assembly of claim 3, further comprising:
   first and second crank pin plugs adapted to be fit within a bore of the crank pin.

5. The polygon crankshaft assembly of claim 1, wherein outer peripheral portions of respective end faces of the crank pin are chamfered.

6. The polygon crankshaft assembly of claim 1, wherein the polygonal-shaped first end portion comprises three side wall portions interconnecting at chamfered corners and the polygonal-shaped second end portion comprises three side wall portions interconnecting at chamfered corners.

7. The polygon crankshaft assembly of claim 1, wherein the cylindrical center portion of the crank pin has a first maximum outer diameter, and the polygonal-shaped first end portion and the polygonal-shaped second end portion have a second maximum outer diameter, wherein the first maximum outer diameter is greater than the second maximum outer diameter.

8. A motorcycle comprising:
   a frame;
   an engine coupled to the frame; and
   a polygon crankshaft assembly coupled to the engine comprising:
      a first polygon flywheel half with a polygonal-shaped aperture therein;
      a second polygon flywheel half with a polygonal shaped aperture therein;
      a crank pin including a polygonal-shaped first end portion, a polygonal-shaped second end portion opposite the polygonal-shaped first end portion, and a cylindrical central portion between the first and second polygonal-shaped end portions, wherein the polygonal-shaped first end portion is press-fit into the polygonal-shaped aperture of the first flywheel half and the polygonal-shaped second end portion is press-fit into the polygonal-shaped aperture of the second flywheel half;
      a bearing positioned at least partially on a surface of the cylindrical central portion; and
      a connecting rod having an aperture at least partially receiving the bearing.

9. The motorcycle of claim 8, wherein the polygon crankshaft assembly further comprises: a bore extending through the crank pin, and first and second crank pin plugs fit within the bore at respective opposing ends of the crank pin.

10. The motorcycle of claim 8, wherein outer peripheral portions of respective end faces of the crank pin are chamfered.

11. The motorcycle of claim 8, wherein the polygonal-shaped first end portion comprises three side wall portions interconnecting at chamfered corners and the polygonal-shaped second end portion comprises three side wall portions interconnecting at chamfered corners.

12. The motorcycle of claim 8, wherein the cylindrical center portion of the crank pin has a first maximum outer diameter, and the polygonal-shaped first end portion and the polygonal-shaped second end portion have a second maximum outer diameter, wherein the first maximum outer diameter is greater than the second maximum outer diameter.

* * * * *